United States Patent [19]

Sturgeon et al.

[11] 4,409,744
[45] Oct. 18, 1983

[54] PROPELLER FAN DRIVE

[75] Inventors: Lloyd F. Sturgeon, Oreland; Paul E. Smith, Philadelphia, both of Pa.

[73] Assignee: Proctor & Schwartz, Inc., Horsham, Pa.

[21] Appl. No.: 271,549

[22] Filed: Jun. 8, 1981

[51] Int. Cl.³ .............................................. F26B 13/06
[52] U.S. Cl. ...................................... 34/207; 34/208; 34/223; 34/230
[58] Field of Search ................. 34/225, 233, 223, 224, 34/230, 232, 203, 207, 208; 417/367; 415/122

[56] References Cited

U.S. PATENT DOCUMENTS

| 1,476,424 | 12/1923 | Sargent | 34/203 |
| 2,319,060 | 5/1943 | Harris | 34/230 |
| 2,688,808 | 9/1954 | Ipsen | 34/219 |
| 2,957,067 | 10/1960 | Scofield | 34/219 |
| 3,070,896 | 1/1963 | Knudson et al. | 34/219 |
| 3,313,039 | 4/1967 | Flaith et al. | 34/115 |

Primary Examiner—Larry I. Schwartz
Attorney, Agent, or Firm—Richard H. Thomas

[57] ABSTRACT

The present invention relates to a means for isolating a fan drive means within a chamber from the fan driven fluid. An enclosure is provided which isolates the fan drive means from the driven fluid. The enclosure having multiple opening to the exterior of the chamber and allowing naturally occurring convection to help maintain ambient conditions around the fan drive means.

5 Claims, 2 Drawing Figures

PROPELLER FAN DRIVE

BACKGROUND OF THE INVENTION

The present invention relates to a means for isolating and protecting the mechanical components of a fan drive from the circulating air or gas stream in a thermal processing chamber such as a dryer, freezer, bread proofer or the like.

Fans are frequently used to move air or other gases that are either heated or cooled relative to ambient conditions. In such case it is advantageous to isolate the motor and associated components which drive the fan from the stream of the driven gas. In this way, the fan drive motor and associated components are not subjected to the heated or cooled driven air and their life is thus extended. In some applications, such as food drying, it is also advantageous to prevent the contamination of the circulating air by oil or other potentially contaminating materials associated with the motor or fan drive means. For example, if a fan is being used to drive heated air through ductwork, it is common practice to mount the motor which propels the fan on the exterior of the ductwork adjacent to the fan and using a drive belt or other fan drive means to propel the fan on the interior of the ductwork and thus move the heated air.

In some circumstances, however, this type of arrangement is not entirely satisfactory. For example, if the heated air is intended to be used in the drying of food or food products, then complete cleaning of all interior surfaces of the ductwork and fan mechanism are required periodically. However, because the fan motor is mounted on the exterior surface of the ductwork adjacent to the fan, such surface must be a permanently fixed surface and cannot be easily removed for cleaning purposes. A further problem of this arrangement is that even though the fan drive motor is located outside of the air stream, the fan drive means are located inside the air stream and even if isolated from the air stream by an enclosure, such enclosure becomes heated because there is generally very poor air circulation within such enclosures.

In accord with the present invention, a new fan drive means enclosure has now been developed to overcome the above-identified disadvantages of the prior art enclosures. The present enclosure allows for the mounting of the fan drive motor in an out-of-the-way location, isolates the fan drive means from the fan driven air and provides a simple and efficient means of circulating cooling air through the enclosure. This is accomplished by providing two or more opening means from the enclosure to the exterior of the ductwork or chamber. In a preferred embodiment of the present invention the opening means are located in the top and the bottom of the ductwork or chamber thereby taking maximum advantage of the "chimney effect" created by slightly warmed air rising within the fan drive means enclosure which provides a natural form of air circulation therein by convection.

SUMMARY OF THE INVENTION

The present invention is an enclosure for a fan drive means located within a chamber. The chamber defines a passage through which a fan driven fluid passes (usually heated or cooled air). The enclosure comprises a means for isolating said fan drive means from said fan driven fluid. The enclosure has at least two opening defining means to the exterior of the chamber. Further, the enclosure is disposed to allow circulation of ambient air from one of said opening defining means past the fan drive means and out at least one other opening defining means without having any substantial contact with the fan driven fluid.

DETAILED DESCRIPTION OF THE INVENTION

Figure 1:
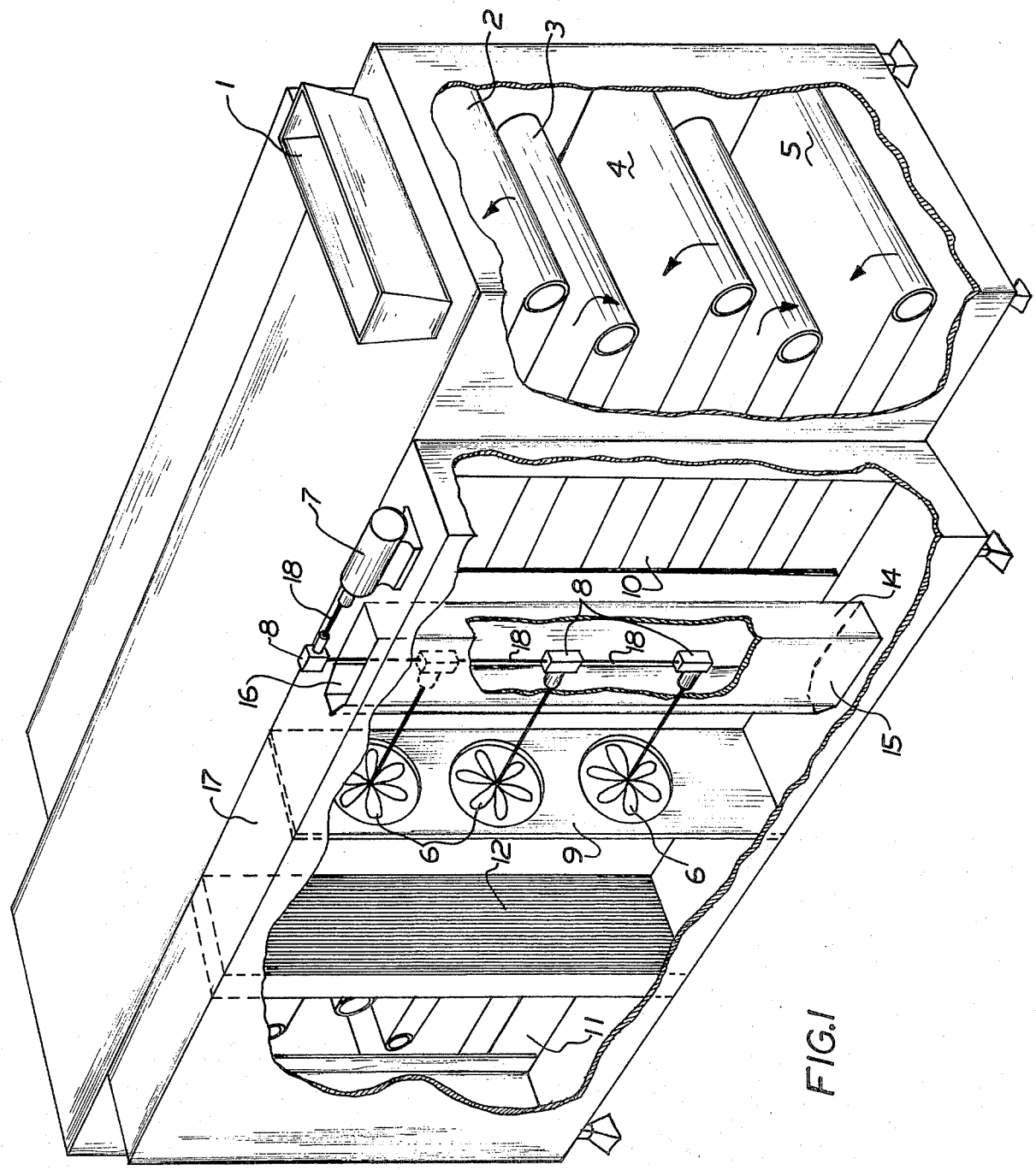
FIG. 1 shows a schematic of a multi-conveyor food dryer having an array of three fans in a chamber on each side of the main dryer chamber. The fans are propelled by a single motor located on top of said chamber through a fan drive means located within a chimney-like enclosure which isolates the fan drive means from the moving air within the chamber.

Referring to FIG. 1, a food material to be dried is loaded into hopper 1 which feeds the food material onto a first conveyor 2. The first conveyor transports the food material the length of the main dryer chamber and upon reaching the far end of the main dryer chamber the food material falls onto a second conveyor 3. The food material is then transported back to the free-end of the main dryer chamber and falls onto a third conveyor 4 and the process continues until the food material falls onto a last conveyor 5 which transports the food material the length of the main dryer chamber a final time and continues to convey the food material out of the dryer thus completing the drying process.

While the food material is being transported back and forth through the main dryer chamber, drying air is circulated through the dryer. Propeller-type fans 6 driven by a motor 7 through fan drive means consisting of gear boxes 8 and shafts 18 propel air through a chamber 17 along the side of the main dryer chamber. Baffle 9 prevents back mixing of air within the chamber and thus improves the fan efficiency and insures air movement in only one direction within the chamber. The fan propelled air enters the dryer through opening 11 to pass over and through the material on the conveyors, and at the same time air is withdrawn from the dryer into the chamber 17 through opening 10. Air entering chamber 17 through opening 10 is in turn passed through heat exchange means 12 wherein the air is heated.

The fan drive means consisting of gear boxes 8 and shafts 18 is located within chimney-like enclosure 14 which isolates the fan drive means from he fan driven air within the chamber 17. Further, the enclosure 14 has opening means 16 at the top and the bottom 15 which allow ambient air to freely circulate therein. During operation of the dryer, warmed fan driven air within the chamber 17 contacts the walls of the enclosure 14 and causes a slight warming thereof. The enclosure walls in turn warm air within enclosure 14. This air tends to rise within enclosure 14 and results in the natural ventilation thereof. The degree of heat transfer from the circulating air stream to the air within the chimney-like fan drive enclosure may be controlled by insulating the walls of the enclosure.

Figure 2:
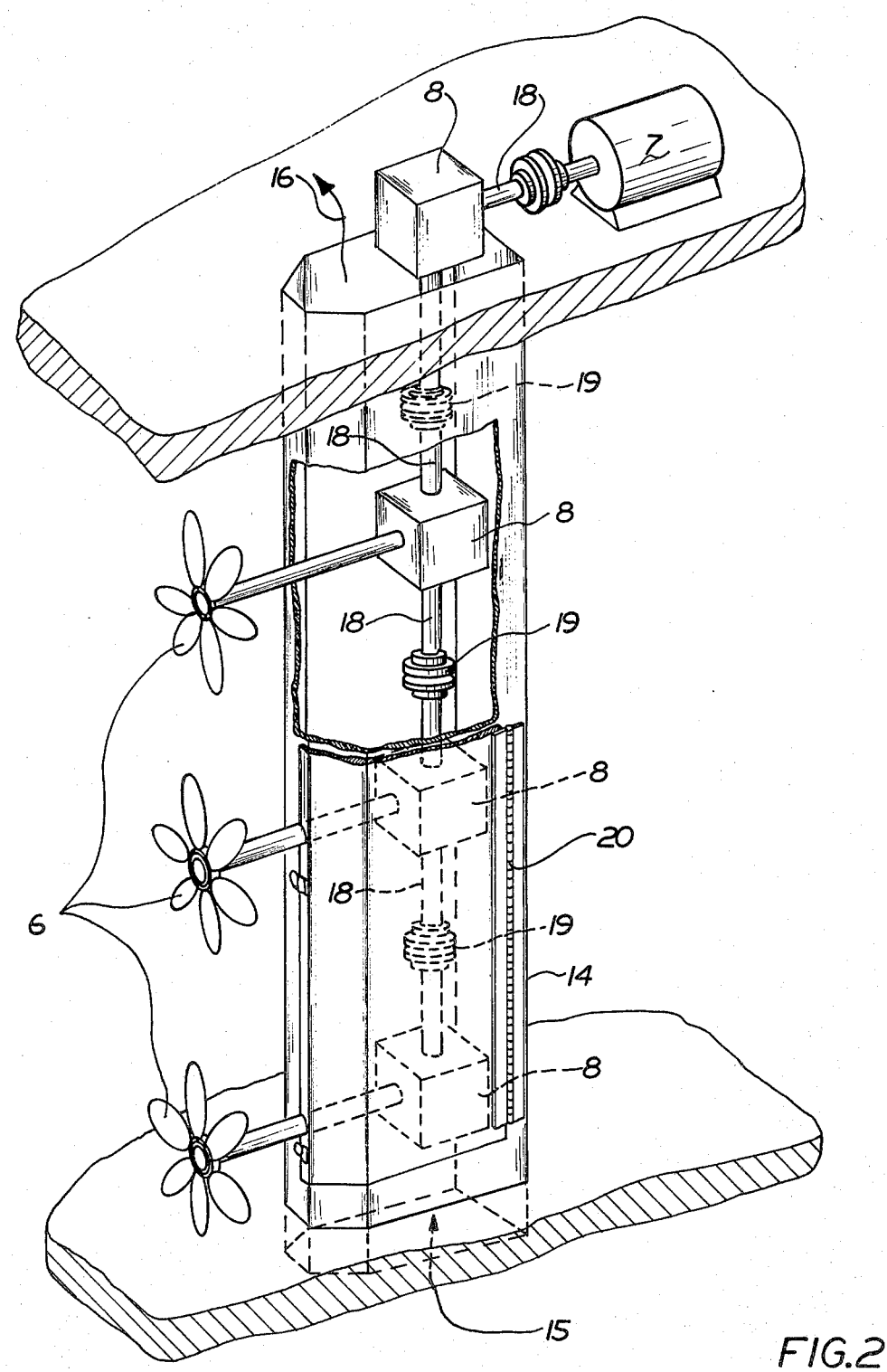
FIG. 2 shows a schematic of just the fans, fan drive means, and chimney-like enclosure shown on FIG. 1.

Referring now to FIG. 2, an isolated view of the enclosure 14, fans 6, motor 7, fan drive means consisting of gear boxes 8 and shafts 18 is shown. Couplings 19 are illustrated to show one possible means for connecting shafts 18 and gear boxes 8 of the fan drive means. Futher, a hinged door 20 extending along a substantial portion of one side of the enclosure 14 is shown. The hinged door 20 allows easy access to the fan drive means within the enclosure 14 for maintenance and cleaning.

The present invention relates to the above-described enclosure or similar means for isolating a fan drive means from the fan driven fluid. It can be utilized in any of numerous devices in which a heated or cooled fluid is conveyed through a defined passageway wherein the fluid is propelled by a fan. In addition to the above-described dryer, the present invention also finds application in other heating and cooling systems such as, for example, heating and cooling systems in industrial and residential buildings, in freezers and in forced-air heating devices of all types.

In a typical application fans are used to propel the driven fluid through a passageway defining chamber which typically also contains a heat exchanger or other heating or cooling device to either heat or cool the driven fluid. The most common driven fluid contemplated is air; however, it is contemplated that other fluids including both other gases and liquids can be utilized.

In order to efficiently move air through a chamber, propeller-type fans are typically placed perpendicular to the cross-section of the chamber and the remainder of the chamber cross-section is blocked off to prevent driven air from recirculating around the fan. When so arranged, the fan impeller rotates around a shaft which is parallel in direction to the direction of the driven fluid movement and which is located close to the center of the cross-section of the chamber. Therefore, the fan drive means typically must be located within the cross-section of the chamber. The fan drive means can be a motor or a power transmission means connected to a remotely located motor.

The isolating means for the fan drive means according to the present invention is an enclosure which separates the fan drive means from the fan driven fluid and has two or more opening means to the exterior of the driven fluid passageway. In the drawings, enclosure 14 is such isolating means. The operating means and the enclosure are disposed to allow ambient air to circulate from one of the openings past the fan drive means through the enclosure and out another opening means. The enclosure can be of any appropriate size and shape; however, it is preferred that it be streamlined as much as possible to minimize interference with the fan driven fluid. For example, the enclosure can be designed to have a small cross-section perpendicular to the direction of flow of the driven fluid. In addition, the portions of the enclosure which form leading and trailing edges relative to the flow of the driven fluid can be tapered or modified according to known aerodynamic principles to improve air flow around the enclosure. Further, if propeller-type fans are utilized, it will be advantageous to provide particular streamlining measures for the sections of the enclosure which are contacted by air driven by the tips of the propeller blades. Greater efficiencies are obtainable in this fashion because a greater volume of air circulates in these regions.

The enclosure can be constructed of any appropriate material for the environment to which it is exposed. Exemplary materials include sheet metal, such as galvanized or aluminized steel, stainless steel, low carbon steel, fiberglass, plywood, and other dimensionally stable relatively planar construction materials.

A preferred arrangement for the chimney-like fan drive enclosure is to orient it substantially vertically and interconnected with opening means in the top and the bottom of the fluid passage chamber. Further preferred for optimum air circulation, the enclosure has a relatively uniform cross-section throughout. These preferred embodiments enable the use of a naturally occurring "chimney effect" to provide ambient air circulation through the enclosure thus cooling (or heating) the fan drive means while keeping it isolated from the driven fluid.

The fluid impeller of the fan can be of any conventional design. However, a propeller design is preferred for most applications requiring moving large volumes of air or other gases against relatively low static pressures. In addition, one or more fans can be utilized and driven by fan drive means located within a single enclosure. If a multiplicity of fans is utilized, it is preferred that they be in a substantially linear arrangement. When so arranged, a single enclosure having a relatively straight design for efficient air circulation can be utilized. Accordingly, a preferred arrangement for a multiplicity of fans is for the fans to be installed substantially vertically and in a linear arrangement similar to that shown in FIGS. 1 and 2.

The fans are preferably driven by a single motor located on the top or bottom of the chamber through fan drive means which interconnects the multiplicity of fans with the motor. Individual fans can also be driven by individual motors located within the enclosure. This allows the sides of the chamber to be removably affixed to allow easy access to all sections of the chamber for cleaning, there being no motors or other obstructions necessarily installed on the sides of the chamber.

Either rotating shafts or drive belts or other means can be utilized to transmit power from the motor to the fan impeller blade. The fan impellers can rotate at the same speed as the motor, or they can rotate faster or slower. Preferably they rotate faster. This reduces vibration and friction in the fan drive means. Appropriately selected drive pulleys or gear boxes can be utilized to achieve this result.

At least a portion of the enclosure inside of the chamber can be hinged or removably affixed to be easily opened for access, cleaning and oiling of the parts contained therein. A hinged door running for a substantial length of the enclosure is a convenient and effective way for providing this access.

A small fan can be fitted in the enclosure preferably near one end to force air through the enclosure thus improving the air circulation and the heating or cooling capacity associated with that air circulation. Such a fan can be installed on a shaft of the fan drive means to accomplish this result.

As used herein, the term "convection" means the circulatory motion that occurs in a fluid at a non-uniform temperature owing to the variation of its density and the action of gravity.

We claim:

1. An assembly comprising a chamber defining a passageway for fan driven fluid, fan means for driving said fluid, fan drive transmission means connected to said fan means, and an enclosure located within said chamber wherein said enclosure comprises:

a substantially vertical means for isolating said fan drive transmission means from said fan driven fluid, said means for isolating comprising upper and lower opening means vertically spaced apart above and below said transmission means, the upper opening means being open to the ambient at a point above the chamber, the lower opening means being open to the ambient at a point below the chamber, the opening means being adapted to allow circulation of ambient air by convection from the lower of said opening means past said fan drive transmission means and out the upper of said opening means without any substantial contact with said fan driven fluid.

2. The assembly of claim 1 wherein the upper of said opening means is in the top of said chamber and the lower of said opening means is in the bottom of said chamber.

3. The assembly of claim 1 wherein said means for isolating has a substantially uniform cross-section.

4. The assembly of claim 1 wherein said chamber defines a passageway for heated air circulating in a dryer for food.

5. The assembly of claim 1 wherein said means for isolating has a removably affixed portion for access to the interior of said enclosure.

* * * * *